(12) United States Patent
Mitsui et al.

(10) Patent No.: US 11,227,423 B2
(45) Date of Patent: Jan. 18, 2022

(54) IMAGE AND SOUND PICKUP DEVICE, SOUND PICKUP CONTROL SYSTEM, METHOD OF CONTROLLING IMAGE AND SOUND PICKUP DEVICE, AND METHOD OF CONTROLLING SOUND PICKUP CONTROL SYSTEM

(71) Applicant: YAMAHA CORPORATION, Hamamatsu (JP)

(72) Inventors: Daisuke Mitsui, Hamamatsu (JP); Takayuki Inoue, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 181 days.

(21) Appl. No.: 16/573,035

(22) Filed: Sep. 17, 2019

(65) Prior Publication Data
US 2020/0013209 A1  Jan. 9, 2020

Related U.S. Application Data

(63) Continuation of application No. PCT/JP2017/011382, filed on Mar. 22, 2017.

(51) Int. Cl.
*G06K 9/00*  (2006.01)
*G06T 11/60*  (2006.01)
(Continued)

(52) U.S. Cl.
CPC .......... *G06T 11/60* (2013.01); *G06K 9/00288* (2013.01); *G10L 17/00* (2013.01); *G10L 21/10* (2013.01)

(58) Field of Classification Search
CPC .. G06T 11/60; G06K 9/00288; G06K 9/0053; G06K 9/0057; G10L 21/10; G10L 17/00; G10L 25/03; G10L 25/57
(Continued)

(56) References Cited

U.S. PATENT DOCUMENTS

2001/0024233 A1\* 9/2001 Urisaka .............. H04N 5/23206
348/211.6
2005/0140810 A1\* 6/2005 Ozawa ............. H04N 5/225251
348/333.02
(Continued)

FOREIGN PATENT DOCUMENTS

JP  2009086055 A  4/2009
JP  2010148132 A  7/2010
(Continued)

OTHER PUBLICATIONS

English translation of Written Opinion issued in Intl. Appln. No. PCT/JP2017/011382 dated Jun. 13, 2017, previously cited in IDS filed Sep. 17, 2019.
(Continued)

*Primary Examiner* — Van D Huynh
(74) *Attorney, Agent, or Firm* — Rossi, Kimms & McDowell LLP

(57) ABSTRACT

Provided is a method of controlling an image and sound pickup device, which is includes obtaining a plurality of audio signals and a participant image, which shows a plurality of participants, and generating location information about a sound source location by using comparison information about a comparison among the plurality of audio signals and face recognition that is performed on the participant image; and generating an estimated utterer image, which displays an estimated utterer, by using the location information.

14 Claims, 12 Drawing Sheets

(51) Int. Cl.
*G10L 21/10* (2013.01)
*G10L 17/00* (2013.01)

(58) Field of Classification Search
USPC ........................................................ 382/115
See application file for complete search history.

(56) References Cited

U.S. PATENT DOCUMENTS

| | | | | |
|---|---|---|---|---|
| 2010/0254543 | A1* | 10/2010 | Kjolerbakken | H04R 1/406 381/92 |
| 2012/0035927 | A1* | 2/2012 | Yamada | G10L 25/78 704/242 |
| 2012/0162259 | A1* | 6/2012 | Sakai | G02B 27/017 345/634 |
| 2012/0163610 | A1* | 6/2012 | Sakagami | H04R 3/005 381/56 |
| 2013/0124209 | A1* | 5/2013 | Yamada | G06K 9/0057 704/275 |
| 2014/0154968 | A1* | 6/2014 | Root | H04H 20/61 455/3.05 |
| 2014/0376740 | A1* | 12/2014 | Shigenaga | G08B 13/19652 381/92 |
| 2015/0147048 | A1* | 5/2015 | Kim | H04N 21/4852 386/282 |
| 2016/0234593 | A1* | 8/2016 | Matsumoto | H04R 1/406 |

FOREIGN PATENT DOCUMENTS

| | | | |
|---|---|---|---|
| JP | 2010251916 | A | 11/2010 |
| JP | 2015159461 | A * | 9/2015 |
| JP | 2015159461 | A | 9/2015 |
| JP | 2016146547 | A | 8/2016 |

OTHER PUBLICATIONS

International Preliminary Report on Patentability issued in Intl. Appln. No. PCT/JP2017/011382 dated Oct. 3, 2019 English translation provided.

International Search Report issued in Intl. Appln. No PCT/JP2017/011382 dated Jun. 13, 2017. English translation provided.

Written Opinion issued in Intl. Appln. No. PCT/JP2017/011382 dated Jun. 13, 2017.

Office Action issued in Japanese Appln. No. 2019-506784 dated Jun. 2, 2020. Computer generated English translation provided.

Office Action issued in Japanese Appln. No. 2021-016613 dated Nov. 30, 2021. English machine translation provided.

Tomino. "A Speaker Zooming Method for Room-to-room TV Conference," Transactions of Information Processing Society of Japan. Jul. 15, 2006: 2091-2098. vol. 47, No. 7. Cited in NPL 1. English abstract provided.

* cited by examiner

IMAGE AND SOUND PICKUP DEVICE, SOUND PICKUP CONTROL SYSTEM, METHOD OF CONTROLLING IMAGE AND SOUND PICKUP DEVICE, AND METHOD OF CONTROLLING SOUND PICKUP CONTROL SYSTEM

CROSS-REFERENCE TO RELATED APPLICATION

The present application is continuation of International Application No. PCT/JP2017/011382 filed on Mar. 22, 2017. The contents of the application are hereby incorporated by reference into this application.

BACKGROUND

1. Field

The present disclosure relates to an image and sound pickup device, a sound pickup control system, a method of controlling an image and sound pickup device, and a method of controlling a sound pickup control system.

2. Description of the Related Art

In Japanese Patent Application Laid-open No. 2016-146547, there is disclosed a sound pickup system including: a camera configured to pick up an image of a target space; a microphone array configured to pick up a sound with the use of a plurality of microphones; a sound source analyzer configured to calculate a sound source location based on audio data of the picked up sound; an image display processor configured to display image data, which includes the picked up image of the target space and sound source location display indicating the sound source location, on a display; and a user input device configured to receive the specification of a point at which a sound picked up by the microphones is to be enhanced in the target space image displayed on the display.

In the sound pickup system of the related art, the sound source analyzer calculates the sound source location based only on the audio data of picked up sound, and required directionality is accordingly very high.

SUMMARY

The present disclosure has been made in view of the problem described above, and an object of the present invention is therefore to achieve a configuration for identifying a sound source location without requiring high directionality of a sound pickup function.

An image and sound pickup device according to at least one embodiment of the present disclosure includes: at least one processor; and at least one memory device configured to store a plurality of instructions, which, when executed by the at least one processor, cause the at least one processor to operate to: obtain a plurality of audio signals and a participant image, which shows a plurality of participants, and generate location information about a sound source location by using comparison information about a comparison among the plurality of audio signals and face recognition that is performed on the participant image; and generate an estimated utterer image, which shows an estimated utterer, by using the location information.

A sound pickup control system according to at least one embodiment of the present disclosure includes: at least one processor; and at least one memory device configured to store a plurality of instructions, which, when executed by the at least one processor, cause the at least one processor to operate to: obtain a plurality of audio signals and a participant image, which shows a plurality of participants, and generate location information about a sound source location by using comparison information about a comparison among the plurality of audio signals and face recognition that is performed on the participant image; generate at least one estimated utterer image, which shows an estimated utterer, by using the location information; display the at least one estimated utterer image on a display device; receive selection of one estimated utterer image out of the at least one estimated utterer image; and generate a directionality control signal with respect to the selected one estimated utterer image.

A method of controlling an image and sound pickup device according to at least one embodiment of the present disclosure includes: obtaining a plurality of audio signals and a participant image, which shows a plurality of participants, and generating location information about a sound source location by using comparison information about a comparison among the plurality of audio signals and face recognition that is performed on the participant image; and generating an estimated utterer image, which shows an estimated utterer, by using the location information.

A method of controlling a sound pickup control system according to at least one embodiment of the present disclosure includes: obtaining a plurality of audio signals and a participant image, which shows a plurality of participants, and generating location information about a sound source location by using comparison information about a comparison among the plurality of audio signals and face recognition that is performed on the participant image; generating at least one estimated utterer image, which shows an estimated utterer, by using the location information; displaying the at least one estimated utterer image on a display device; receiving selection of one estimated utterer image out of the at least one estimated utterer image; and generating a directionality control signal with respect to the selected one estimated utterer image.

DETAILED DESCRIPTION OF THE INVENTION

First Embodiment

A first embodiment of the present disclosure is described below with reference to the drawings.

[Sound Pickup Control System 100]

Figure 1:
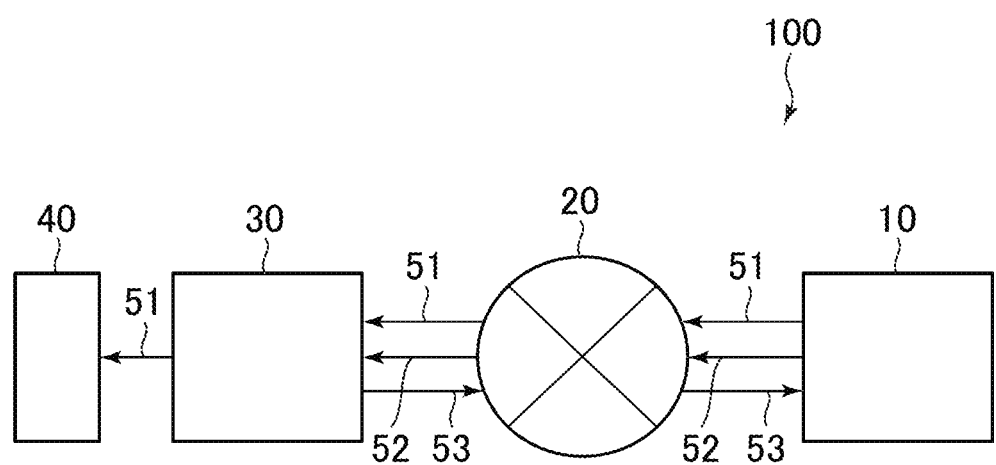
FIG. 1 is a block diagram of a sound pickup control system according to a first embodiment of the present disclosure.

FIG. 1 is a block diagram of a sound pickup control system 100 according to the first embodiment. The sound pickup control system 100 includes, as illustrated in FIG. 1, an image and sound pickup device 10, an operating device 30 to be connected to the image and sound pickup device 10 via a network 20, and a reproduction device 40 configured to execute reproduction by following an instruction from the operating device 30. The reproduction device 40 may be externally connected to the operating device 30, or may be built in the operating device 30.

The image and sound pickup device 10 receives input of an utterer's voice to generate an audio signal 51. The image and sound pickup device 10 picks up a participant image, which shows a plurality of participants attending a conference, a lecture, or a similar event. The image and sound pickup device 10 identifies a range in which a sound source location is contained from phase differences among a plurality of audio signals 51, and performs face recognition on the participant image, to thereby identify the position of the face of an estimated utterer, namely, the sound source location. The image and sound pickup device 10 generates an estimated utterer image 52 based on the identified face position. The image and sound pickup device 10 transmits the estimated utterer image 52 and the audio signals 51 to the operating device 30 over the network 20.

The operating device 30 is a device to be used by an operator who is an utterer in, for example, a conference or a lecture, and receives the audio signals 51 and the estimated utterer image 52 over the network 20. The operating device 30 includes a display device therein or is externally connected to a display device to display at least one estimated utterer image 52 received from the image and sound pickup device 10 on the display device. When the operator selects one estimated utterer image 52 from among the at least one estimated utterer image 52 displayed on the display device, the operating device 30 generates a directionality control signal 53 with respect to the selected estimated utterer image 52, and transmits the directionality control signal 53 to the image and sound pickup device 10 over the network 20. The directionality control signal 53 is a signal to be used to control output of the relevant audio signal 51 from the image and sound pickup device 10, based on a piece of location information that is associated with the estimated utterer image 52.

The image and sound pickup device 10 enhances, based on the directionality control signal 53, output of the audio signal 51 of a sound source location that is associated with the estimated utterer image 52 such that this audio signal 51 stands out from the rest of the audio signals 51, and transmits the enhanced output to the operating device 30.

The operating device 30 receives the audio signal 51 of sounds around the utterer that are enhanced, and instructs the reproduction device 40, which includes a speaker and others, to reproduce the received audio signal 51.

With this configuration, the estimated utterer image 52 in which the face of the estimated utterer is enlarged is displayed on the display device, thereby enabling the operator to easily recognize the utterer.

In the case of an event held in a large room and attended by many participants, a sound pickup function included in the image and sound pickup device 10 is required to have very high directionality in order to identify the position of an utterer's face only from phase differences among the audio signals 51. The image and sound pickup device 10, however, accomplishes successful identification of the position of an utterer's face even when the directionality of the sound pickup function is not so high from the location information that is generated by using face recognition technology in combination with the phase differences.

More specific configurations of the image and sound pickup device 10 and the operating device 30 are described below.

[Image and Sound Pickup Device 10]

Figure 2:
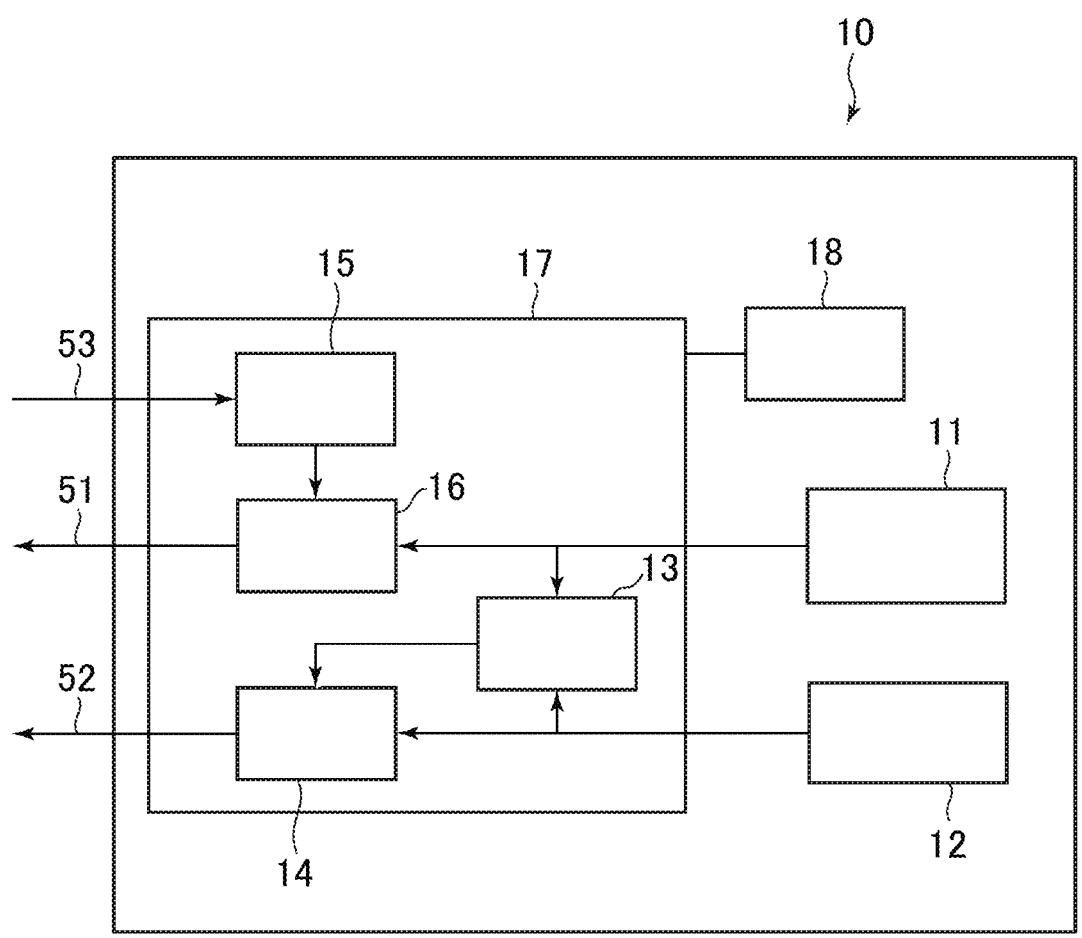
FIG. 2 is a block diagram of an image and sound pickup device according to the first embodiment.

FIG. 2 is a block diagram of the image and sound pickup device 10 according to the first embodiment. The image and sound pickup device 10 includes, as illustrated in FIG. 2, a sound pickup unit 11 configured to receive input of a sound and generate a plurality of audio signals 51, an image pickup unit 12 configured to pick up a participant image, which shows a plurality of participants, a location information generator 13 configured to generate the location information for identifying a sound source location, with the use of phase differences among the plurality of audio signals 51 and face recognition performed on the participant image, and an image generator 14 configured to generate, from the location information, the estimated utterer image 52, which shows an estimated utterer, and transmit the estimated utterer image 52 to the operating device 30.

The image and sound pickup device 10 further includes an input unit 15 configured to receive the directionality control signal 53, which is transmitted from the operating device 30, and a directionality calculator 16 configured to obtain the directionality control signal 53 from the input unit 15 and control output of the relevant audio signal 51 based on the directionality control signal 53.

The location information generator 13, the image generator 14, the input unit 15, and the directionality calculator 16 may be configured as one controller 17. The controller 17 includes a CPU and a memory. The controller 17 follows a program stored in a storage 18, which is included in the image and sound pickup device 10, to perform overall control of the image and sound pickup device 10 by executing Step S101 to Step S107, which are described later, and other processing procedures. Step S101 is a step of generating audio signals. Step S102 is a step of picking up a participant image. Step S103 is a step of generating the location information. Step S104 is a step of generating an estimated utterer image. Step S105 is a step of transmitting the estimated utterer image. Step S106 is a step of receiving the directionality control signal. Step S107 is a step of calculating directionality. The program may be installed from various recording media irrespective of whether the medium is optical, magnetic, or of other types, or may be downloaded over the Internet.

The image and sound pickup device 10 in the configuration described in the first embodiment includes the storage 18. The storage 18, however, is not an indispensable component, and the controller 17 may execute various control steps with the use of a program recording medium or the like that is connected to the image and sound pickup device 10.

Figure 3:
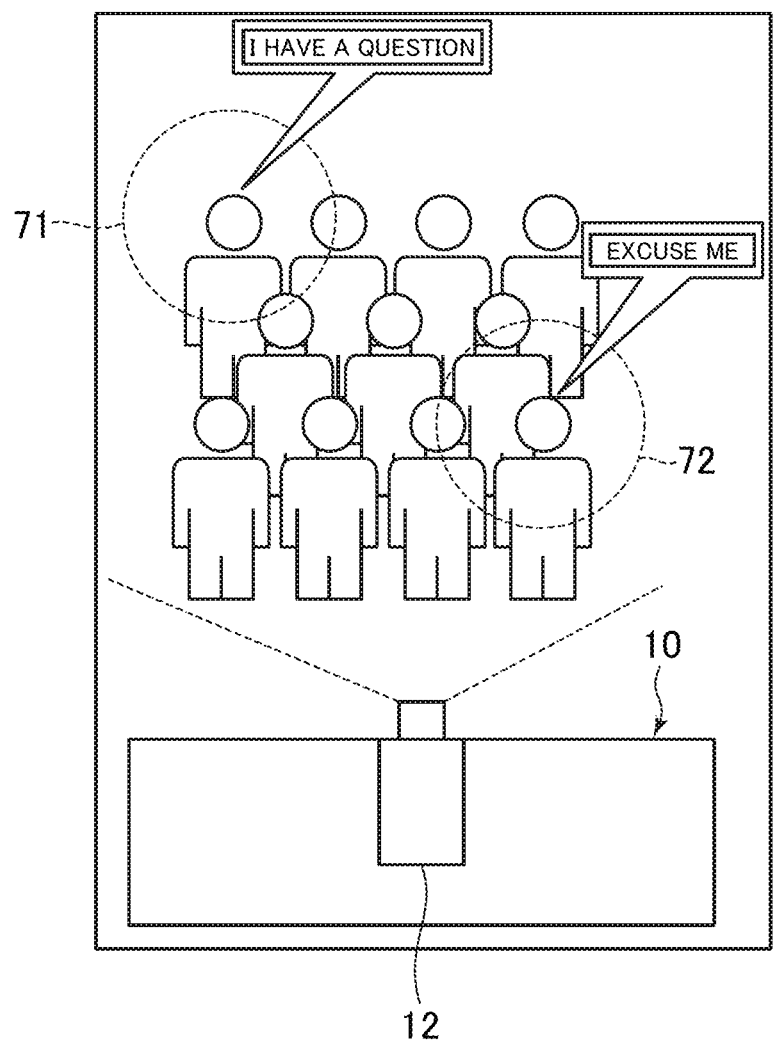
FIG. 3 is a schematic diagram for illustrating an example of an arrangement relation between the image and sound pickup device according to the first embodiment and participants.

FIG. 3 is a schematic diagram for illustrating an example of an arrangement relation between the image and sound pickup device 10 according to the first embodiment and participants. As illustrated in FIG. 3, the image and sound pickup device 10 is placed in the ceiling of a front portion of a room in which the event is held, and an image of the entire front portion of the room is picked up by the image pickup unit 12 included in the image and sound pickup device 10. Where the image and sound pickup device 10 is set up is not limited to the room's ceiling, and is only required to be placed in the front portion of the room.

[Sound Pickup Unit 11]

In the first embodiment, the sound pickup unit 11 includes a microphone array, which includes a plurality of microphones. The sound pickup unit 11 picks up sounds of the room in which the image and sound pickup device 10 is placed. The sound pickup unit 11 may be placed in the same housing that contains the image pickup unit 12 illustrated in FIG. 3, or may be placed in another housing set up in the ceiling of the front portion of the room.

The plurality of microphones included in the microphone array that serves as the sound pickup unit 11 are each assigned a sound pickup point, and each pick up sounds around the assigned sound pickup point to generate as many audio signals 51 as the number of microphones. The sound pickup unit 11 includes, for example, an amplifier, an A/D converter, and an encoder. The amplifier amplifies audio data of the sounds picked up by the microphones. The A/D converter converts the audio data output from the amplifier into digital audio data. The encoder encodes the digital audio data to generate the audio signals.

The sound pickup unit 11 transmits, as illustrated in FIG. 2, the plurality of audio signals 51 to the location information generator 13 and the directionality calculator 16.

[Image Pickup Unit 12]

The image pickup unit 12 includes at least one camera to pick up a participant image 60, which shows a plurality of participants. In the first embodiment, the image pickup unit 12 includes one camera with which an image of a frontal view of all participants present in the room is picked up.

The image pickup unit 12 transmits the picked up participant image 60 to the location information generator 13 and the image generator 14.

[Location Information Generator 13]

As described above, the sound pickup unit 11 generates as many audio signals 51 as the number of microphones from sounds picked up by the plurality of microphones, and transmits the audio signals 51 to the location information generator 13. The location information generator 13 receives the plurality of audio signals 51 and identifies, from phase differences, which are comparison information about a comparison among the plurality of audio signals 51, a first range 71 and a second range 72, which are illustrated in FIG. 3 as ranges containing sound source locations.

The location information generator 13 in the configuration described in the first embodiment identifies a sound source location from phase differences serving as the comparison information about a comparison among the plurality of audio signals 51. Instead of phase differences among the plurality of audio signals 51, power ratios among the plurality of audio signals 51 may be used to identify a sound source location.

In the first embodiment, the location information generator 13 discriminates human voice from mere noise by performing a frequency analysis on the audio signals 51, and obtains, as the location information, information about a location at which human voice has been uttered out of a plurality of sound source locations. To give a specific example, the location information generator 13 performs Fourier transform on the audio signals 51 for transformation from the time domain in which the signal amplitude is plotted on the axis of ordinate and time is plotted on the axis of abscissa into the frequency domain in which the signal amplitude is plotted on the axis of ordinate and the frequency is plotted on the axis of abscissa, determines the audio signal 51 that is contained in a predetermined range (for example, from 0.2 kHz to 4 kHz) appropriate for a range of frequencies of human voice as an audio signal of human voice, and determines the audio signal 51 that is outside the predetermined range as noise. The location information generator 13 identifies a range containing a sound source location only for the audio signal 51 that is contained in the frequency range predetermined as a frequency range of human voice.

The location information generator 13 also receives the participant image from the image pickup unit 12. The location information generator 13 performs face recognition on the participant image obtained from the image pickup unit 12 in the range that has been identified from phase differences among the audio signals 51 as a range containing a sound source location, to thereby identify the position of the face of an utterer in the participant image, namely, a sound source location. Information for identifying the sound source location is the location information.

Figure 4:
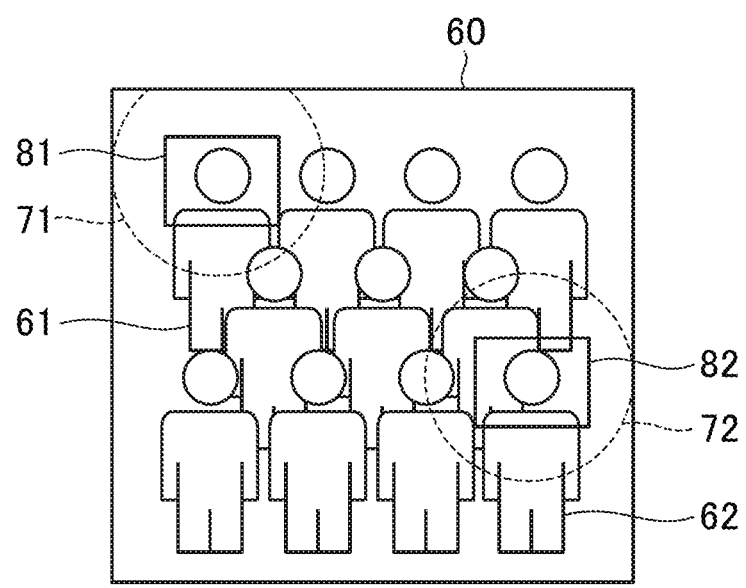
FIG. 4 is a schematic diagram for illustrating an example of face recognition that uses a participant image in the first embodiment.

FIG. 4 is a schematic diagram for illustrating an example of face recognition that uses the participant image in the first embodiment. As illustrated in FIG. 4, the participant image 60 contains images of all participants present in a room in which the event is held. In this example, a first participant 61, who is located on the left side in the back in the participant image 60, and a second participant 62, who is located on the right side in the front, have made some utterances. Based on the audio signals 51 of the utterances picked up by the sound pickup unit 11, the location information generator 13 identifies the first range 71, which contains a first sound source location, and the second range 72, which contains a second sound source location. The first range 71 contains the first participant 61, and the second range 72 contains the second participant 62.

The location information generator 13 performs face recognition in the first range 71, to thereby identify a face position 81 of the first participant 61 as the first sound source location. The location information generator 13 performs face recognition in the second range 72 as well, to thereby identify a face position 82 of the second participant 62 as the second sound source location.

In the first embodiment, the location information generator 13 transmits to the image generator 14 the face position 81 of the first participant 61 and the face position 82 of the second participant 62 as the location information. The location information generator 13 associates the first range 71 with the face position 81 of the first participant 61 and associates the second range 72 with the face position 82 of the second participant 62 before transmitting the location information to the image generator 14.

[Image Generator 14]

The image generator 14 receives the location information transmitted from the location information generator 13 and the participant image 60 transmitted from the image pickup unit 12 to generate the estimated utterer image 52, which shows an estimated utterer.

The image generator 14 in the first embodiment receives, as the location information, information about the face position 81 of the first participant 61 and the face position 82 of the second participant 62, which are illustrated in FIG. 4, from the location information generator 13. Based on the information about the face positions, the image generator 14 generates a cutout image from the participant image 60 transmitted from the image pickup unit 12.

Figure 5:
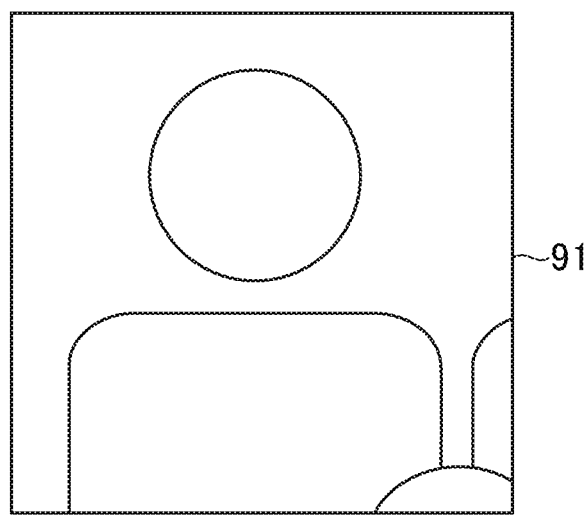
FIG. 5 is a schematic diagram for illustrating an example of a cutout image that is generated from the participant image in the first embodiment.
Figure 6:
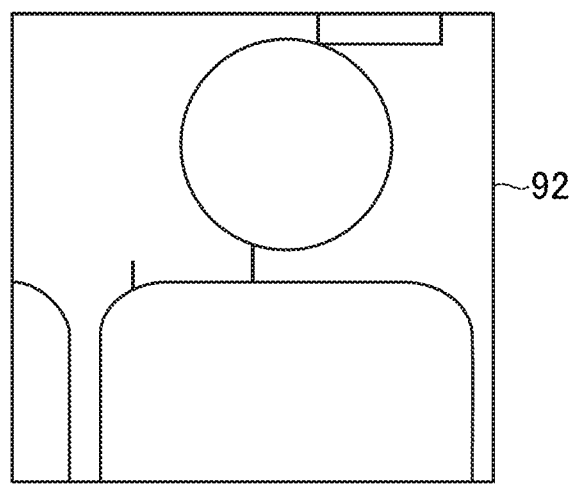
FIG. 6 is a schematic diagram for illustrating another example of a cutout image that is generated from the participant image in the first embodiment.

FIG. 5 and FIG. 6 are each a schematic diagram for illustrating an example of a cutout image that is generated from the participant image 60 in the first embodiment. In the first embodiment, the image generator 14 generates a first cutout image 91 illustrated in FIG. 5, in which the face of the first participant 61 is enlarged, based on the face position 81 of the first participant 61, which has been received from the location information generator 13. The image generator 14 also generates a second cutout image 92 illustrated in FIG. 6, in which the face of the second participant 62 is enlarged, based on the face position 82 of the second participant 62, which has been received from the location information generator 13.

The image generator 14 transmits to the operating device 30 the first cutout image 91 and the second cutout image 92 as the estimated utterer images 52. The first cutout image 91 and the second cutout image 92 are generated based on the location information from the location information generator 13, that is, information about the face position 81 of the first participant 61 and information about the face position 82 of the second participant 62, respectively. The image generator 14 accordingly associates the pieces of information about the face positions with the estimated utterer images 52 before transmitting the estimated utterer images 52 to the operating device 30.

In the first embodiment, the image generator 14 also associates each estimated utterer image 52 with information about a location in the participant image 60 that corresponds to the estimated utterer image 52 before transmitting the estimated utterer image 52 to the operating device 30. This configuration enables the operating device 30, which is described later, to display the participant image 60 and the estimated utterer image 52 in association with each other.

The image generator 14 in the configuration described in the first embodiment generates the first cutout image 91 and the second cutout image 92 as the estimated utterer images 52, and transmits the cutout images to the operating device 30. Other images may be transmitted as the estimated utterer images 52. For example, the image and sound pickup device 10 may have a configuration in which the image pickup unit 12 described above includes a plurality of cameras, a first camera picks up the participant image 60, a second camera picks up an image in the direction of a sound source location based on the location information generated by the location information generator, and the image generator 14 obtains this image in the direction of the sound source location as the estimated utterer image 52. With this configuration, as many second cameras as the number of utterers are required to be provided in order to pick up images of a plurality of utterers and generate a plurality of estimated utterer images 52.

The first embodiment takes as an example a configuration in which the image generator 14 generates a plurality of estimated utterer images, which display a plurality of estimated utterers, and transmits the plurality of estimated utterer images to the operating device 30, but the image generator 14 may generate, and transmit to the operating device 30, an estimated utterer image displaying a single estimated utterer. However, the configuration in which the image generator 14 generates, and transmits to the operating device 30, a plurality of estimated utterer images 52, which display a plurality of estimated utterers, allows the plurality of estimated utterer images 52 to be displayed side by side on a display device 33, which is described later. The operator can consequently operate the operating device 30 while visually comparing the plurality of estimated utterer images 52, which is a merit.

[Input Unit 15]

The input unit 15 receives a directionality control signal transmitted from the operating device 30 and transmits the directionality control signal to the directionality calculator 16. A directionality control signal for one of the estimated utterer images 52 is information for controlling output of the relevant audio signal 51 received from the sound pickup unit 11 based on a piece of location information that is associated with the estimated utterer image 52.

In the first embodiment, each directionality control signal includes a piece of location information that is associated with one of the first cutout image 91 and the second cutout image 92, that is, information about one of the face position 81 of the first participant 61 and the face position 82 of the second participant 62.

The input unit 15 transmits the directionality control signal including this location information to the directionality calculator 16.

[Directionality Calculator 16]

The directionality calculator 16 obtains the directionality control signal 53 from the input unit 15, and obtains the relevant audio signal 51 from the sound pickup unit 11. The directionality calculator 16 controls output of the audio signal 51 received from the sound pickup unit 11, based on the directionality control signal 53.

When the operator operating the operating device 30 selects the first cutout image 91, which shows the face of the first participant 61, first location information associated with the first cutout image 91, that is, information about the face position 81 of the first participant 61, is included in the directionality control signal 53. The details are described later. Based on this directionality control signal 53, the directionality calculator 16 identifies the audio signal 51 of a sound issued from the face position 81 of the first participant 61 out of a plurality of audio signals 51 received from the sound pickup unit 11, enhances the identified audio signal 51 such that this audio signal 51 stands out from the rest of the audio signals 51, and transmits the enhanced audio signal 51 to the operating device 30.

[Operating Device 30]

Figure 7:
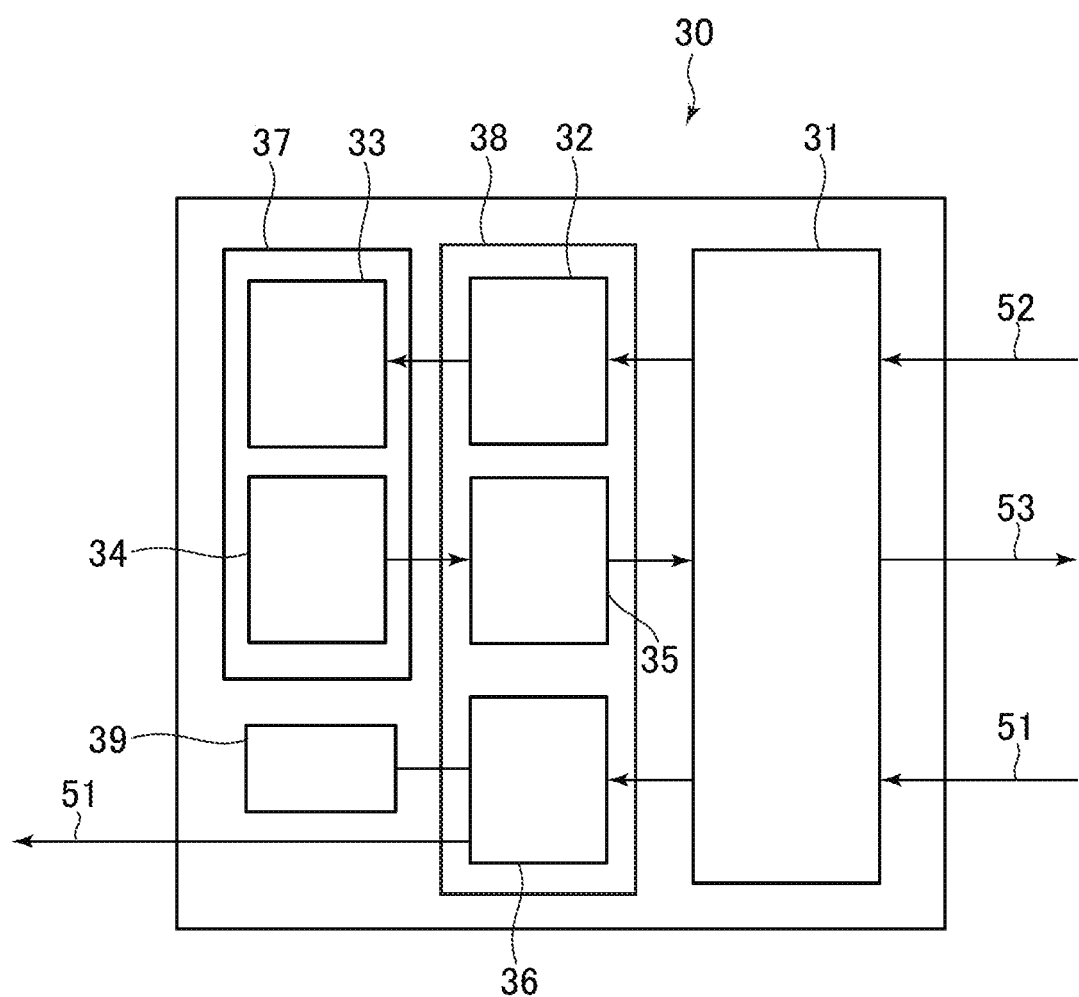
FIG. 7 is a block diagram of an operating device in the first embodiment.

FIG. 7 is a block diagram of the operating device 30 in the first embodiment. The operating device 30 includes, as illustrated in FIG. 7, a communicator 31 configured to receive at least one estimated utterer image 52, which is generated by the image and sound pickup device 10, a display processor 32 configured to display the at least one estimated utterer image 52 on the display device 33, a selection receiver 34 configured to receive the selection of one estimated utterer image 52 from among the at least one estimated utterer image 52, a control signal generator 35 configured to generate the directionality control signal 53 with respect to the selected estimated utterer image 52, and a reproduction processor 36 configured to receive the relevant audio signal 51 from the image and sound pickup device 10 and instruct the reproduction device 40 to reproduce the audio signal 51.

The display processor 32, the control signal generator 35, and the reproduction processor 36 may be configured as one controller 38. The controller 38 includes a CPU and a memory. The controller 38 follows a program stored in a storage 39, which is included in the operating device 30, to perform overall control of the operating device 30 by executing Step S201 to Step S206, which are described later, and other processing procedures. Step S201 is a step of receiving an estimated utterer image. Step S202 is a step of processing display. Step S203 is a step of receiving a selection. Step S204 is a step of generating a directionality control signal. Step S205 is a step of receiving an audio signal. Step S206 is a step of processing reproduction. The program may be installed from various recording media irrespective of whether the medium is optical, magnetic, or of other types, or may be downloaded over the Internet.

The operating device 30 is used by an operator who, for example, gives a lecture in a front portion of a room in which the lecture is held.

In the first embodiment, the operating device 30 includes a touch panel 37, and the touch panel 37 includes the display device 33 and the selection receiver 34.

Figure 8:
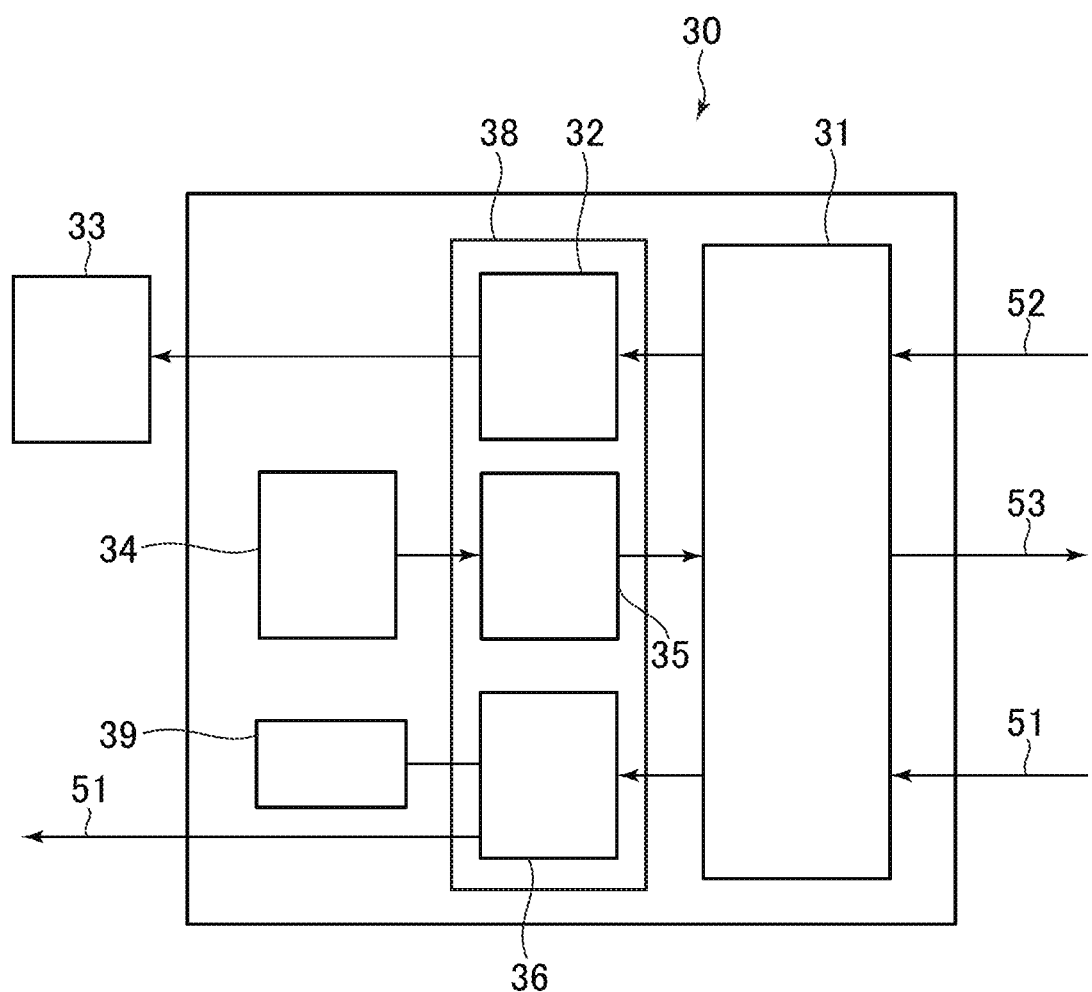
FIG. 8 is a block diagram for illustrating another example of the operating device in the first embodiment.

As illustrated in FIG. 8, which is a block diagram for illustrating another example of the operating device 30, the operating device 30 may have a configuration in which the display device 33 is not included and the display processor 32 instructs the display device 33 that is externally connected to the operating device 30 to display the estimated utterer image 52.

[Communicator 31]

The communicator 31 supports communication that uses a wireless LAN, a wired LAN, a WAN, infrared rays, radio waves, Bluetooth (a trademark), and the like, and exchanges signals with the image and sound pickup device 10 over the network 20.

In the first embodiment, the communicator 31 receives, as the estimated utterer images 52, the first cutout image 91 and the second cutout image 92, which are generated by the image and sound pickup device 10. The communicator 31 transmits the first cutout image 91 and the second cutout image 92 to the display processor 32. The first cutout image 91 is associated with information about the face position 81 of the first participant 61 as the first location information. The second cutout image 92 is associated with information about the face position 82 of the second participant 62 as the second location information.

The communicator 31 also transmits the directionality control signal 53 generated by the control signal generator 35 to the image and sound pickup device 10.

[Display Processor 32]

The display processor 32 displays at least one estimated utterer image 52 on the display device 33. That is, the display processor 32 displays a plurality of estimated utterer images 52 on the display device 33 when a plurality of estimated utterer images 52 are obtained and, when a single estimated utterer image 52 is obtained, displays the single estimated utterer image 52 on the display device 33.

Figure 9:
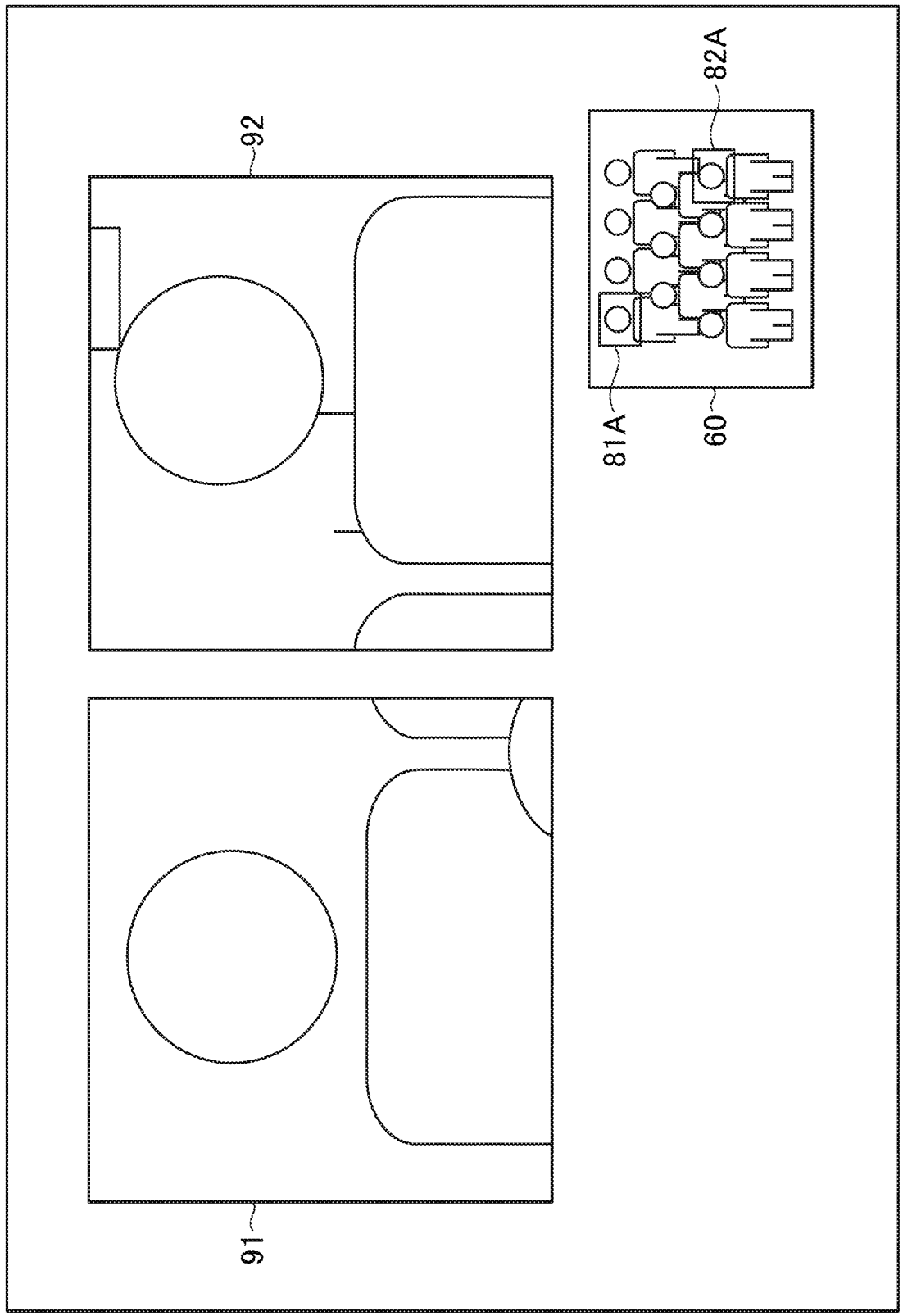
FIG. 9 is a schematic diagram for illustrating an example of a screen to be displayed on a display device in the first embodiment.

In the first embodiment, the first cutout image 91 illustrated in FIG. 5 and the second cutout image 92 illustrated in FIG. 6 are displayed on the display device 33. FIG. 9 is a schematic diagram for illustrating an example of a screen to be displayed on the display device 33 in the first embodiment. As illustrated in FIG. 9, the display processor 32 displays the first cutout image 91 and the second cutout image 92 side by side on the display device 33. The number of cutout images to be displayed on the display device 33 may be matched to the number of cutout images received from the communicator 31.

With a plurality of estimated utterer images 52 displayed on the display device 33, the operator can operate the operating device 30 while visually comparing a plurality of utterer images 52, and select an utterer whom the operator particularly wants to listen to and whose voice is accordingly to be enhanced.

This merit that allows the operator to operate the operating device 30 while visually comparing a plurality of estimated utterer images 52 by displaying a plurality of estimated utterer images 52 on the display device 33 is obtained also when the location information generator 13 generates location information without using face recognition. When the location information generator 13 generates location information without using face recognition, cutout images of, for example, the first range 71 and the second range 72 are generated as the estimated utterer images 52 based on the first range 71 and the second range 72, which are illustrated in FIG. 3 and which contain sound source locations.

The display processor 32 in the first embodiment displays the participant image 60 on the display device 33 along with the estimated utterer images 52. The display processor 32 enables the operator to check the view of the entire room as well by displaying the participant image 60 on the display device 33 along with the estimated utterer images 52.

In the first embodiment, each estimated utterer image 52 received by the operating device 30 is associated by the image and sound pickup device 10 with location information about a location in the participant image 60 that corresponds to the estimated utterer image 52. This enables the display processor 32 to display the participant image 60 and the estimated utterer image 52 in association with each other on the display device 33.

Specifically, as illustrated in FIG. 9, the display processor 32 displays a display frame 81A on the display device 33 at the position of the face of the first participant 61 in the participant image 60, and also displays a display frame 82A on the display device 33 at the position of the face of the second participant 62 in the participant image 60. For each of the display frames 81A and 82A, the display processor 32 displays the display frame on the display device 33 in a color and uses the same color to display at least a part of the estimated utterer image 52 corresponding to the display frame. To give a specific example, the display frame 81A of the face position 81 of the first participant 61 and a frame of the first cutout image 91 are displayed in a red color, whereas the display frame 82A of the face position 82 of the second participant 62 and a frame of the second cutout image 92 are displayed in a green color. This configuration enables the operator to easily figure out where the first participant 61 and the second participant 62 whose images are displayed as cutout images are located in the participant image 60.

Portions of the first cutout image 91 and the second cutout image 92 that are displayed in color are not limited to the frames, and it is sufficient if at least a part of the first cutout image 91 and the second cutout image 92 is displayed in color in a manner that enables the operator to perceive the first cutout image 91 and the second cutout image 92 in association with the display frame 81A and the display frame 82A, respectively, which are included in the participant image 60.

With this configuration, the first cutout image 91, in which the face of the first participant 61 as an estimated utterer is enlarged, and the second cutout image 92, in which the face of the second participant 62 as another estimated utterer is enlarged, are displayed on the display device 33, and the operator can accordingly recognize utterers with ease.

In the case of an event held in a large room and attended by many participants, very high directionality is required in order to identify the position of an utterer's face only from phase differences among the audio signals 51 of the sound pickup unit 11. As described in the first embodiment, however, the image and sound pickup device 10 successfully identifies, through face recognition, a sound source location in a range that is identified from phase differences among the audio signals as a range containing a sound source location even when the directionality of the sound pickup unit 11 is not so high, by using face recognition technology in the location information generator 13 in combination with the phase differences. In addition, the range containing a sound source location can be narrowed with the use of phase differences among the audio signals 51, and the range on which face recognition is to be performed can accordingly be narrowed, which leads to efficient identification of a sound source location.

In the configuration described in the first embodiment, the communicator 31 of the operating device 30 receives the first cutout image 91 and the second cutout image 92 as the estimated utterer images 52, and the first cutout image 91 and the second cutout image 92 are displayed on the display device 33. Another configuration may be employed in which, when the communicator 31 of the operating device 30 receives, as the estimated utterer images 52, images in the directions of respective sound source locations that are picked up by a plurality of cameras, the images in the directions of the respective sound source locations are displayed on the display device 33 as the estimated utterer images 52.

[Display Device 33]

The display device 33 is built in the operating device 30 or externally connected to the operating device 30, and displays at least one estimated utterer image 52 and others by following an instruction from the display processor 32.

A general liquid crystal display, EL display, plasma display, or projector, for example, may be used as the display device 33 that is externally connected to the operating device 30. When the operator uses a notebook computer in his or her lecture, the notebook computer may be connected to the operating device 30 to display at least one estimated utterer image 52 on a display device that is included in the notebook computer in response to an instruction from the display processor 32 included in the operating device 30.

[Selection Receiver 34]

The selection receiver 34 receives the selection of one estimated utterer image 52 out of the at least one estimated utterer image 52. That is, when the selection receiver 34 obtains a plurality of estimated utterer images 52, the operator selects one estimated utterer image 52 out of the plurality of estimated utterer images 52, and the selection receiver 34 receives the selection. When the selection receiver 34 obtains a single estimated utterer image 52, the operator selects whether the voice of an utterer contained in the single estimated utterer image 52 is to be enhanced for listening, and the selection receiver 34 receives the operator's selection.

As illustrated in FIG. 7, the operating device 30 in the first embodiment includes the touch panel 37, and a touch sensor included in the touch panel 37 function as the selection receiver 34.

As illustrated in FIG. 8, the operating device 30 may include the selection receiver 34 that is an input device, instead of including the touch panel 37 and the display device 33. The input device may be a general input device, for example, a keyboard and a mouse. Alternatively, the selection receiver 34 may be a gesture recognition device, which includes a camera and an image recognition device and which receives a selection made by the operator by recognizing the operator's gesture.

The selection receiver 34 receives the operator's selection and transmits a result of the selection to the control signal generator 35. In the first embodiment, it is assumed that the operator determines that the voice of the first participant 61 is to be enhanced for listening, and accordingly selects the first cutout image 91. The selection receiver 34 transmits, as a result of the operator's selection, a piece of location information associated with the first cutout image 91, namely, information about the face position 81 of the first participant 61 illustrated in FIG. 4, to the control signal generator 35.

[Control Signal Generator 35]

The control signal generator 35 generates the directionality control signal 53 with respect to the selected estimated utterer image 52.

In the first embodiment, the control signal generator 35 receives from the selection receiver 34 information about the face position 81 of the first participant 61 as a piece of location information associated with the first cutout image 91, and accordingly generates the directionality control signal 53 that gives an instruction to enhance the output of the audio signal 51 of a sound issued from the face position 81 of the first participant 61.

The control signal generator 35 transmits the generated directionality control signal 53 to the image and sound pickup device 10 via the communicator 31.

[Reproduction Processor 36]

The reproduction processor 36 receives one of the audio signals 51 from the image and sound pickup device 10 via the communicator 31, and instructs the reproduction device 40 to reproduce this audio signal 51.

In the first embodiment, the directionality control signal 53 that gives an instruction to enhance the output of the audio signal 51 of a sound issued from the face position 81 of the first participant 61 is transmitted from the control signal generator 35 to the image and sound pickup device 10, and is received by the directionality calculator 16, which is included in the image and sound pickup device 10, via the input unit 15 described above.

Based on this directionality control signal 53, the directionality calculator 16 identifies the audio signal 51 of a sound issued from the face position 81 of the first participant 61 out of a plurality of audio signals 51 received from the sound pickup unit 11, enhances the identified audio signal 51 such that this audio signal 51 stands out from the rest of the audio signals 51, and transmits the enhanced audio signal 51 to the operating device 30.

The reproduction processor 36 accordingly instructs the reproduction device 40 to reproduce the audio signal 51 of the enhanced sound from the face position 81 of the first participant 61.

As a result, the operator can listen to an enhanced voice of the first participant 61 selected by the operator himself/herself.

The sound pickup control system 100, which includes the image and sound pickup device 10 according to the first embodiment and the operating device 30, thus enables the operator to easily select an utterer whom the operator wants to listen to in an enhanced voice with the use of the estimated utterer images 52 in which participants' faces are enlarged.

In the case of an event held in a large room and attended by many participants, very high directionality is required in order to identify the position of an utterer's face only from phase differences among the audio signals 51 of the sound pickup unit 11. As described in the first embodiment, however, the image and sound pickup device 10 successfully identifies, through face recognition, a sound location source, namely, the position of an utterer's face, in a range that is identified from phase differences among the audio signals 51 as a range containing a sound source location even when the directionality of the sound pickup unit 11 is not so high, by using face recognition technology in the location information generator 13 in combination with the phase differences. Consequently, the operator can easily select an utterer whom the operator wants to listen to in an enhanced voice with the use of the estimated utterer images 52 in which participants' faces are enlarged.

[Method of Controlling the Image and Sound Pickup Device 10]

Figure 10:
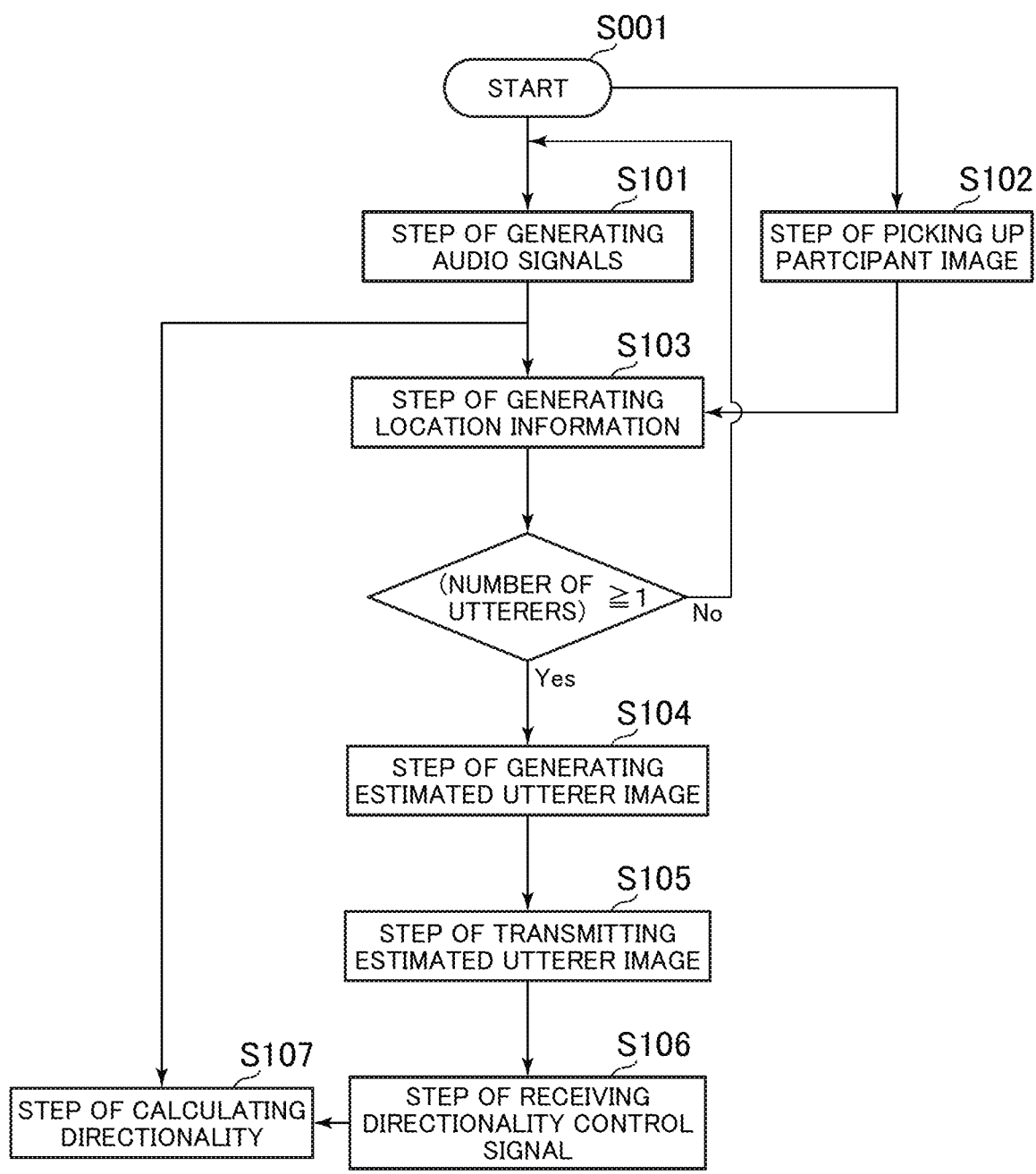
FIG. 10 is a flowchart for illustrating a method of controlling an image and sound pickup device according to the first embodiment.

FIG. 10 is a flowchart for illustrating a method of controlling the image and sound pickup device 10 according to the first embodiment. The method of controlling the image and sound pickup device 10 according to the first embodiment is described below with reference to FIG. 10.

[Step S101 of Generating Audio Signals]

The sound pickup unit 11 of the image and sound pickup device 10 executes Step S101 of generating audio signals, in which a plurality of audio signals are generated.

In the first embodiment, the sound pickup unit 11 is a microphone array including a plurality of microphones, each of which picks up sounds around a sound pickup point assigned to the microphone. The sound pickup unit 11 generates as many audio signals 51 the number of microphones in this manner.

The sound pickup unit 11 transmits the plurality of audio signals 51 to the location information generator 13 and the directionality calculator 16.

[Step S102 of Picking up a Participant Image]

The image pickup unit 12 of the image and sound pickup device 10 executes Step S102 of picking up a participant image, in which the participant image 60 displaying a plurality of participants is picked up.

In the first embodiment, the image pickup unit 12 includes one camera, and uses the camera to pick up an image of all participants present in a room of an event from the front as the participant image 60.

The image pickup unit 12 transmits the picked up participant image 60 to the location information generator 13 and the image generator 14.

Step S102 may be executed concurrently with Step S101 of generating audio signals, or may be executed after Step S101 of generating audio signals and before Step S103 of generating location information, which is described later.

[Step S103 of Generating Location Information]

The location information generator 13 of the image and sound pickup device 10 executes Step S103 of generating location information, in which location information for estimating a sound source location from phase differences among a plurality of audio signals 51 is generated.

The location information generator 13 identifies the position of an estimated utterer's face as a sound source location by using face recognition technology on the participant image 60 obtained from the image pickup unit 12, in addition to phase differences among the plurality of audio signals 51 obtained from the sound pickup unit 11.

In the first embodiment, the location information generator 13 identifies the first range 71 and the second range 72, each of which contains a sound source location, from phase differences among the audio signals 51, and uses face recognition technology on the participant image 60 to identify the face position 81 of the first participant 61 and the face position 82 of the second participant 62 in the first range 71 and the second range 72. The face position 81 of the first participant 61 and the face position 82 of the second participant 62 are transmitted to the image generator 14 as the first location information and the second location information, respectively. When transmitting the location information to the image generator 14, the location information generator 13 may associate the first range 71 with the face position 81 of the first participant 61 and associate the second range 72 with the face position 82 of the second participant 62.

When there is at least one estimated utterer, the flow proceeds to Step S104 of generating an estimated utterer image, which is described later. When there is no estimated utterer, the flow returns to Step S101 of generating audio signals described above.

[Step S104 of Generating an Estimated Utterer Image]

The image generator 14 of the image and sound pickup device 10 executes Step S104 of generating an estimated utterer image, which shows an estimated utterer.

In the first embodiment, the image and sound pickup device 10 uses the first location information and the second location information obtained from the location information generator 13 to generate cutout images of the estimated utterers from the participant image 60 obtained from the image pickup unit 12. The cutout images generated in the first embodiment are the first cutout image 91 generated with respect to the first participant 61, and the second cutout image 92 generated with respect to the second participant 62.

The first cutout image 91 and the second cutout image 92 are associated with pieces of the location information from the location information generator 13, that is, information about the face position 81 of the first participant 61 and information about the face position 82 of the second participant 62, respectively. In the first embodiment, the image generator 14 further associates each estimated utterer image 52 with location information that corresponds to the estimated utterer image 52 in the participant image 60.

In the example described in the first embodiment, the image generator 14 generates the first cutout image 91 and the second cutout image 92 as the estimated utterer images 52 in Step S104 of generating an estimated utterer image. There may be employed an alternative method in which the image pickup unit 12 picks up an image in the direction of a sound source location based on the location information from the location information generator 13, and the image generator 14 obtains the image in the direction of the sound source location as the estimated utterer image 52.

[Step S105 of Transmitting an Estimated Utterer Image]

The image generator 14 of the image and sound pickup device 10 executes Step S105 of transmitting an estimated utterer image, in which each generated estimated utterer image 52 is transmitted to the operating device 30.

In the first embodiment, the image generator 14 transmits the cutout images associated with the location information to the operating device 30 as the estimated utterer images 52.

Each estimated utterer image 52 transmitted by the image generator 14 to the operating device 30 in the first embodiment is further associated with location information about a location that corresponds to the estimated utterer image 52 in the participant image 60.

[Step S106 of Receiving a Directionality Control Signal]

Step S106 of receiving a directionality control signal is a step to be executed in the image and sound pickup device 10 after Step S201 of receiving an estimated utterer image, Step S202 of processing display, Step S203 of receiving selection, and Step S204 of generating a directionality control signal are executed in a method of controlling the operating device 30, which is described later.

In Step S106 of receiving a directionality control signal, the input unit 15 of the image and sound pickup device 10 receives the directionality control signal 53 transmitted from the operating device 30.

In the first embodiment, the input unit 15 receives from the operating device 30 the directionality control signal 53 that gives an instruction to enhance output of the audio signal 51 of a sound issued from a location that is indicated by the piece of location information associated with the first cutout image 91, namely, the face position 81 of the first participant 61.

[Step S107 of Calculating Directionality]

The directionality calculator 16 of the image and sound pickup device 10 executes Step S107 of calculating directionality in which output of the audio signal 51 is controlled based on the directionality control signal 53.

In the first embodiment, the directionality calculator 16 receives the directionality control signal 53 that gives an instruction to enhance output of the audio signal 51 of a sound issued from the face position 81 of the first participant 61. Based on this directionality control signal 53, the directionality calculator 16 identifies the audio signal 51 of a sound issued from the face position 81 of the first participant 61 out of a plurality of audio signals 51 received from the sound pickup unit 11, enhances the identified audio signal 51 such that this audio signal 51 stands out from the rest of the audio signals 51, and transmits the enhanced audio signal 51 to the operating device 30.

Step S205 of receiving an audio signal and Step S206 of processing reproduction are then executed in the method of controlling the operating device 30, which is described later, to enhance, on the operating device 30, the sound from the participant specified by the operator, and output the enhanced sound from the reproduction device 40.

[Method of Controlling the Operating Device 30]

Figure 11:
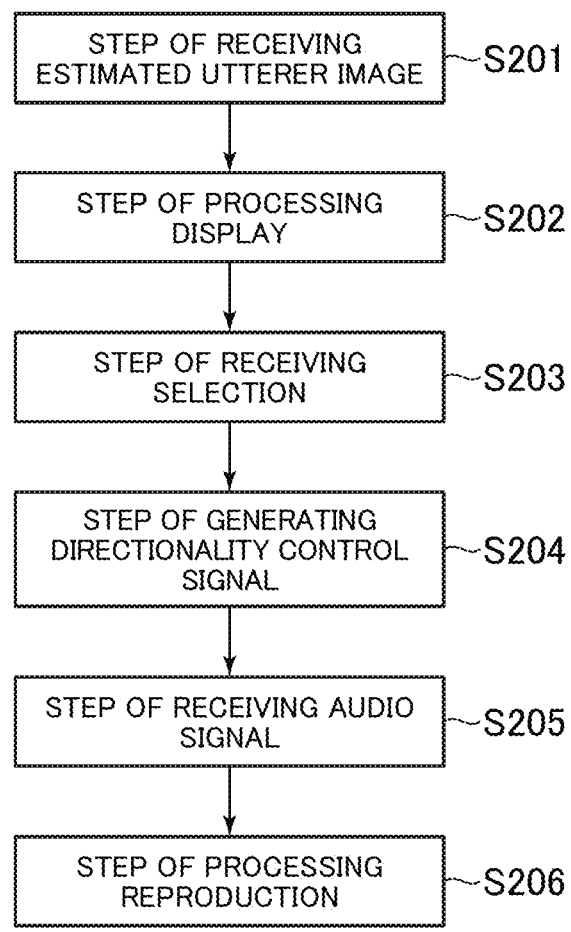
FIG. 11 is a flowchart for illustrating a method of controlling the operating device in the first embodiment.

FIG. 11 is a flow chart for illustrating the method of controlling the operating device 30 in the first embodiment. The method of controlling the operating device 30 in the first embodiment is described below with reference to FIG. 11.

[Step S201 of Receiving an Estimated Utterer Image]

Step S201 is a step to be executed in the operating device 30 after Step S101 of generating audio signals, Step S102 of picking up a participant image, Step S103 of generating location information, Step S104 of generating an estimated utterer image, and Step S105 of transmitting an estimated utterer image are executed in the method of controlling the image and sound pickup device 10 described above.

The communicator 31 of the operating device 30 executes Step S201 of receiving an estimated utterer image, in which at least one estimated utterer image 52 generated by the image and sound pickup device 10 is received.

In the first embodiment, the communicator 31 receives the first cutout image 91 and the second cutout image 92 generated by the image and sound pickup device 10 from the image and sound pickup device 10 as the estimated utterer images 52. The communicator 31 transmits the first cutout image 91 and the second cutout image 92 to the display processor 32.

[Step S202 of Processing Display]

The display processor 32 of the operating device 30 executes Step S202 of processing display, in which at least one estimated utterer image 52 is displayed on the display device 33. That is, the display processor 32 displays a plurality of estimated utterer images 52 on the display device 33 when a plurality of estimated utterer images 52 are obtained and, when a single estimated utterer image 52 is obtained, displays the single estimated utterer image 52 on the display device 33.

In the first embodiment, the display processor 32 displays the first cutout image 91 and the second cutout image 92 on the display device 33, along with the participant image 60.

The display processor 32 in the first embodiment further displays the display frame 81A at the position of the face of the first participant 61 in the participant image 60, and displays the display frame 82A at the position of the face of the second participant 62 in the participant image 60.

In the first embodiment, the first cutout image 91 and the second cutout image 92 are displayed on the display device 33 in Step S202 of processing display because the estimated utterer images 52 obtained by the operating device 30 are the first cutout image 91 and the second cutout image 92. When the operating device 30 obtains, as the estimated utterer images 52, images in the directions of respective sound source locations that are picked up by a plurality of cameras, the images in the directions of the respective sound source locations may be displayed on the display device 33 in Step S202 of processing display.

[Step S203 of Receiving Selection]

The selection receiver 34 of the operating device 30 executes Step S203 of receiving selection, in which the selection of one estimated utterer image 52 out of at least one estimated utterer image 52 is received. That is, when obtaining a plurality of estimated utterer images 52, the selection receiver 34 receives the selection of one estimated utterer image 52 that is selected by the operator's operation out of the plurality of estimated utterer images 52. When the selection receiver 34 obtains a single estimated utterer image 52, the operator determines whether to enhance the voice of the utterer contained in the single estimated utterer image 52 for listening, and the selection receiver 34 receives selection operation based on the operator's determination.

In the first embodiment, it is assumed that the operator determines that the voice of the first utterer 61 is to be enhanced for listening, and accordingly selects the first cutout image 91. The selection receiver 34 transmits, as a result of the operator's selection, a piece of location information associated with the first cutout image 91, namely, information about the face position 81 of the first participant 61, to the control signal generator 35.

[Step S204 of Generating a Directionality Control Signal]

The control signal generator 35 of the operating device 30 executes Step S204 of generating a directionality control signal, in which the directionality control signal 53 is generated with respect to the selected estimated utterer image 52.

In the first embodiment, the control signal generator 35 receives, from the selection receiver 34, information about the face position 81 of the first participant 61 as apiece of location information that is associated with the first cutout image 91, and accordingly generates the directionality control signal 53 that gives an instruction to enhance output of the audio signal 51 of a sound issued from the face position 81 of the first participant 61.

The control signal generator 35 transmits the generated directionality control signal 53 to the image and sound pickup device 10 via the communicator 31.

[Step S205 of Receiving an Audio Signal]

Step S205 of receiving an audio signal is a step to be executed in the operating device 30 after Step S106 of receiving a directionality control signal and Step S107 of calculating directionality are executed in the method of controlling the image and sound pickup device 10 described above.

In Step S205 of receiving an audio signal, the communicator 31 of the operating device 30 receives the audio signal 51.

In the first embodiment, the communicator 31 receives the audio signal 51 of a sound issued from the face position 81 of the first participant 61 and enhanced by the directionality calculator 16.

[Step S206 of Processing Reproduction]

The reproduction processor 36 of the operating device 30 executes Step S206 of processing reproduction, in which the audio signal 51 is received from the communicator 31 and the reproduction device 40 is instructed to reproduce the audio signal 51.

In the first embodiment, the reproduction processor 36 obtains the audio signal 51 of the enhanced sound from the face position 81 of the first participant 61, and instructs the reproduction device 40 to reproduce this audio signal 51.

The control method described above enable the operator to easily select an utterer whom the operator wants to listen to in an enhanced voice, with the use of the estimated utterer images 52 in which participants' faces are enlarged.

According to the method of controlling of the first embodiment, the use of face recognition technology by the location information generator 13 in Step S103 of generating location information in combination with phase differences accomplishes successful identification of the positions of utterers' faces that are contained in the first range 71 and the second range 72 even when the directionality of the sound pickup unit 11 is not so high. Another advantage of the location information generator 13 performing face recognition within the first range 71 and the second range 72, which are identified in advance from phase differences among the audio signals 51, is that the positions of utterers' faces can be identified efficiently.

[Method of Controlling the Sound Pickup Control System 100]

Figure 12:
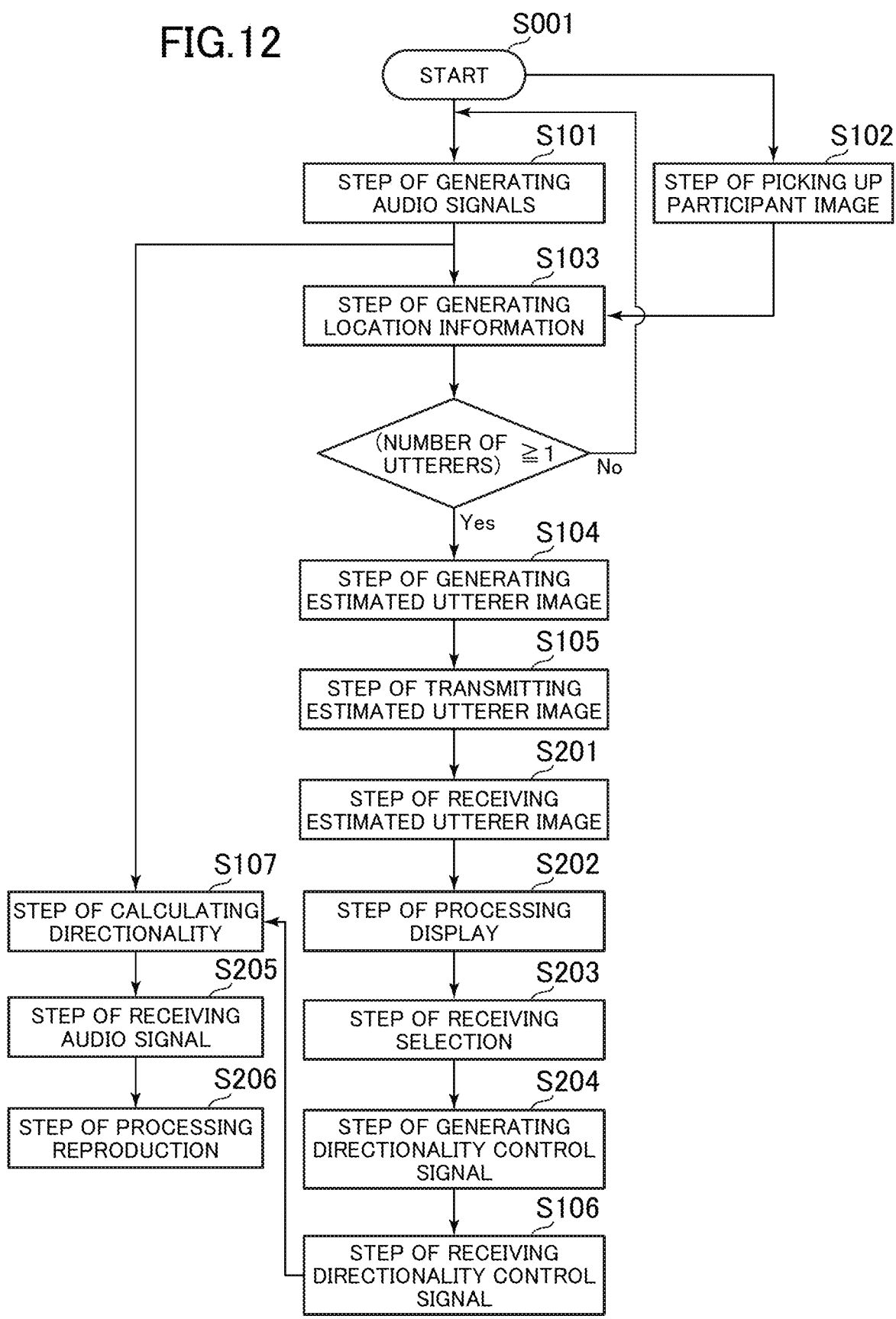
FIG. 12 is a flowchart for illustrating a method of controlling a sound pickup control system according to the first embodiment.

FIG. 12 is a flow chart for illustrating a method of controlling the sound pickup control system 100 according to the first embodiment. Steps of this method are as described in the descriptions given above on the method of controlling the image and sound pickup device 10 and the method of controlling the operating device 30. Descriptions of the steps are therefore omitted here.

As illustrated in FIG. 12, steps to be executed by the image and sound pickup device 10 and steps to be executed by the operating device 30 are mixed in the method of controlling the sound pickup control system 100. The image and sound pickup device 10 executes Step S101 of generating audio signals, Step S102 of picking up a participant image, Step S103 of generating location information, Step S104 of generating an estimated utterer image, and Step S105 of transmitting an estimated utterer image. The operating device 30 subsequently executes Step S201 of receiving an estimated utterer image, Step S202 of processing display, Step S203 of receiving selection, and Step S204 of generating a directionality control signal. The flow then returns to the image and sound pickup device 10, which executes Step S106 of receiving a directionality control signal, and Step S107 of calculating directionality. Thereafter, the operating device 30 executes Step S205 of receiving an audio signal and Step S206 of processing reproduction.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A sound pickup control system comprising:
at least one memory device storing instructions; and
at least one processor that implements the instructions, which to:
obtain a plurality of audio signals and a participant image, which shows a plurality of participants;
generate location information corresponding to a sound source location using comparison information containing a comparison among the obtained plurality of audio signals and face recognition that is performed on the obtained participant image;
generate at least one estimated utterer image, which shows an estimated utterer, using the location information;
display the at least one estimated utterer image on a display device;
receive selection of one estimated utterer image among the at least one estimated utterer image;
generate a directionality control signal with respect to the selected one estimated utterer image;
calculate a directionality of the selected one estimated utter image using the directionality control signal to identify the sound source location of the selected one estimated utter image; and
receive an audio signal using the calculated directionality for reproduction thereof.

2. The sound pickup control system according to claim 1, wherein:
the at least one processor implements the instructions to estimate a range containing the sound source location using the comparison information; and
the face recognition is performed in the range.

3. The sound pickup control system according to claim 1, wherein the comparison information includes phase differences among the plurality of audio signals.

4. The sound pickup control system according to claim 1, wherein the comparison information includes power ratios among the plurality of audio signals.

5. The sound pickup control system according to claim 1, wherein the selected one estimated utterer image is a cutout image showing the selected one estimated utterer.

6. The sound pickup control system according to claim 1, further comprising an image pickup unit configured to pick up an image in a direction of the sound source location, based on the generated location information.

7. The sound pickup control system according to claim 6, wherein the plurality of participants is shown on the participant image picked up by the image pickup unit.

8. The sound pickup control system according to claim 1, wherein:

the at least one processor implements the instructions to perform Fourier transform on the plurality of audio signals to transform from a time domain to a frequency domain, and the at least one processor generates the location information by extracting, from the plurality of audio signals, audio signals that are contained in a frequency range relevant to human voice.

9. The sound pickup control system according to claim 8, wherein the at least one processor generates the location information by extracting the audio signals that are contained in a frequency range of from 0.2 kHz to 4 kHz.

10. The sound pickup control system according to claim 1, further comprising a sound pickup unit configured to receive input of sounds and generate the plurality of audio signals.

11. The sound pickup control system according to claim 10, wherein the sound pickup unit includes a microphone array, which includes a plurality of microphones.

12. The sound pickup control system according to claim 1, further comprising an image pickup unit configured to pick up the participant image.

13. The sound pickup control system according to claim 1, wherein the generated at least one estimated utter image includes a plurality of estimated utterer images, which display a plurality of estimated utterers, using the location information.

14. A method of controlling a sound pickup control system, the method comprising:

obtaining a plurality of audio signals and a participant image, which shows a plurality of participants;

generating location information corresponding to a sound source location using comparison information containing a comparison among the obtained plurality of audio signals and face recognition that is performed on the obtained participant image;

generating at least one estimated utterer image, which shows an estimated utterer, using the location information;

displaying the at least one estimated utterer image on a display device;

receiving selection of one estimated utterer image among the at least one estimated utterer image;

generating a directionality control signal with respect to the selected one estimated utterer image;

calculating a directionality of the selected one estimated utter image using the directionality control signal to identify the sound source location of the selected one estimated utter image; and receiving an audio signal using the calculated directionality for reproduction thereof.

* * * * *